(12) United States Patent  
Boeve et al.

(10) Patent No.: US 8,374,817 B2  
(45) Date of Patent: Feb. 12, 2013

(54) AUTO-CALIBRATION OF ORIENTATION SENSING SYSTEMS

(75) Inventors: Hans Marc Bert Boeve, Hechtel-Eksel (BE); Teunis Jan Ikkink, Geldrop (NL); Haris Duric, Helmond (NL)

(73) Assignee: NXP B.V., Eindhoven (NL)

( * ) Notice: Subject to any disclaimer, the term of this patent is extended or adjusted under 35 U.S.C. 154(b) by 581 days.

(21) Appl. No.: 12/594,244

(22) PCT Filed: Mar. 27, 2008

(86) PCT No.: PCT/IB2008/051148  
§ 371 (c)(1),  
(2), (4) Date: Oct. 1, 2009

(87) PCT Pub. No.: WO2008/122904  
PCT Pub. Date: Oct. 16, 2008

(65) Prior Publication Data  
US 2010/0121599 A1    May 13, 2010

(30) Foreign Application Priority Data

Apr. 4, 2007   (EP) .................................... 07105594  
Mar. 27, 2008   (WO) .................. PCT/IB2008/051148

(51) Int. Cl.  
*G01C 17/38*    (2006.01)

(52) U.S. Cl. ........................................................ 702/93  
(58) Field of Classification Search .................. 702/93; 33/356  
See application file for complete search history.

(56) References Cited

U.S. PATENT DOCUMENTS

| | | | |
|---|---|---|---|
| 4,953,305 | A | 9/1990 | Van Lente |
| 5,644,851 | A | 7/1997 | Blank |
| 6,047,237 | A | 4/2000 | Michmerhuizen |
| 6,173,501 | B1 | 1/2001 | Blank |
| 6,192,315 | B1 | 2/2001 | Geschke |
| 6,301,794 | B1 | 10/2001 | Parks |
| 2004/0267505 | A1 | 12/2004 | Jeong |

FOREIGN PATENT DOCUMENTS

WO        02/46693 A        6/2002

*Primary Examiner* — Jonathan C. Teixeira Moffat  
*Assistant Examiner* — Xiuquin Sun  
(74) *Attorney, Agent, or Firm* — Kramer & Amado P.C.

(57) ABSTRACT

An electronic device has an orientation sensing system for determining an orientation of the device. The system includes a magnetometer and an accelerometer. The system further has a calibration device configured to calibrate the sensing system for operational use. The accelerometer supplies measurements used to constrain a range of possible directions of the external magnetic field to be determined. The calibration device numerically solves a set of equations and is equally usable for a 2D or 3D magnetometer in combination with a 2D or 3D accelerometer.

19 Claims, 7 Drawing Sheets

Fig.1

(102) $\quad \mathbf{MM} = \mathbf{SF}_{MM} \cdot {}^c\mathbf{B} + \beta_{MM}$ (104) $\quad {}^c\mathbf{B} = \left({}^c\mathbf{\Omega} \cdot {}^c\mathbf{B}\right){}^c\mathbf{\Omega} + \mathbf{\Omega} \times \left({}^c\mathbf{B} \times {}^c\mathbf{\Omega}\right)$ $\quad\quad = {}^c\mathbf{B}_{\parallel} + {}^c\mathbf{B}_{\perp}$ (106) $\quad \left\|{}^c\mathbf{B}_{\perp}\right\|^2 = \left\|{}^c\mathbf{B}\right\|^2 - \left({}^c\mathbf{B} \cdot {}^c\mathbf{\Omega}\right)^2$ (108) $\quad {}^c\mathbf{B} = \left\|{}^c\mathbf{B}_{\parallel}\right\| \cdot {}^c\mathbf{\Omega} + \left\|{}^c\mathbf{B}_{\perp}\right\| \cdot \left( \dfrac{{}^c\mathbf{\Omega} \times {}^c\mathbf{c}_x}{\left\|{}^c\mathbf{\Omega} \times {}^c\mathbf{c}_x\right\|} \cdot \cos\alpha + {}^c\mathbf{\Omega} \times \dfrac{{}^c\mathbf{\Omega} \times {}^c\mathbf{c}_x}{\left\|{}^c\mathbf{\Omega} \times {}^c\mathbf{c}_x\right\|} \cdot \sin\alpha \right)$ $\quad\quad = \left\|{}^c\mathbf{B}_{\parallel}\right\| \cdot {}^c\mathbf{\Omega} + \left\|{}^c\mathbf{B}_{\perp}\right\| \cdot \left[ \dfrac{{}^c\mathbf{\Omega} \times {}^c\mathbf{c}_x}{\left\|{}^c\mathbf{\Omega} \times {}^c\mathbf{c}_x\right\|} \quad {}^c\mathbf{\Omega} \times \dfrac{{}^c\mathbf{\Omega} \times {}^c\mathbf{c}_x}{\left\|{}^c\mathbf{\Omega} \times {}^c\mathbf{c}_x\right\|} \right] \cdot \begin{bmatrix} \cos\alpha \\ \sin\alpha \end{bmatrix}$

Fig.2

(302) $\mathbf{MM} = \mathbf{SF}_{MM} \cdot \underbrace{\left[ \dfrac{^c\mathbf{\Omega} \times {}^c\mathbf{c}_x}{\|{}^c\mathbf{\Omega} \times {}^c\mathbf{c}_x\|} \quad {}^c\mathbf{\Omega} \times \dfrac{^c\mathbf{\Omega} \times {}^c\mathbf{c}_x}{\|{}^c\mathbf{\Omega} \times {}^c\mathbf{c}_x\|} \right] \cdot \begin{bmatrix} \cos\alpha \\ \sin\alpha \end{bmatrix} \cdot \|{}^c\mathbf{B}_\perp\|}_{\text{variable}} + \underbrace{\mathbf{SF}_{MM} \cdot {}^c\mathbf{\Omega} \cdot \|{}^c\mathbf{B}_\parallel\| + \boldsymbol{\beta}_{MM}}_{\text{constant}}$ (304) $\text{Compound matrix} = \mathbf{SF}_{MM} \cdot \left[ \dfrac{^c\mathbf{\Omega} \times {}^c\mathbf{c}_x}{\|{}^c\mathbf{\Omega} \times {}^c\mathbf{c}_x\|} \quad {}^c\mathbf{\Omega} \times \dfrac{^c\mathbf{\Omega} \times {}^c\mathbf{c}_x}{\|{}^c\mathbf{\Omega} \times {}^c\mathbf{c}_x\|} \right] \cdot \|{}^c\mathbf{B}_\perp\|$ (306) $\text{Compound offset vector} = \mathbf{SF}_{MM} \cdot {}^c\mathbf{\Omega} \cdot \|{}^c\mathbf{B}_\parallel\| + \boldsymbol{\beta}_{MM}$ (308) 
$^c\mathbf{gm}_z = \dfrac{-{}^c\mathbf{g}}{\|{}^c\mathbf{g}\|}$    Up $^c\mathbf{gm}_x = \dfrac{{}^c\mathbf{g} \times {}^c\mathbf{B}}{\|{}^c\mathbf{g} \times {}^c\mathbf{B}\|}$    East $^c\mathbf{gm}_y = {}^c\mathbf{gm}_z \times {}^c\mathbf{gm}_x$    North

(502) $\mathbf{AM} = \mathbf{SF}_{AM} \cdot {}^c\mathbf{g} + \boldsymbol{\beta}_{AM}$ (504) ${}^c\mathbf{g}_i = \mathbf{SF}_{AM}^{-1} \cdot (\mathbf{AM}_i - \boldsymbol{\beta}_{AM})$ (506) $\begin{cases} \mathbf{MM}_i = \mathbf{SF}_{MM} \cdot {}^c\mathbf{B}_i + \boldsymbol{\beta}_{MM} \\ \|{}^c\mathbf{B}_i\| = 1 \\ {}^c\mathbf{B}_i \cdot {}^c\mathbf{g}_i = K \end{cases}$, $i = 1 \cdots N$ (508) $\begin{cases} \mathbf{AM}_i = \mathbf{SF}_{AM} \cdot {}^c\mathbf{g}_i + \boldsymbol{\beta}_{AM} \\ \mathbf{MM}_i = \mathbf{SF}_{MM} \cdot {}^c\mathbf{B}_i + \boldsymbol{\beta}_{MM} \\ \|{}^c\mathbf{B}_i\| = 1 \\ {}^c\mathbf{B}_i \cdot {}^c\mathbf{g}_i = K \end{cases}$, $i = 1 \cdots N$ $$(602) \begin{cases} \mathbf{MM}_i = \mathbf{SF}_{MM} \cdot {}^c\mathbf{B}_i + \boldsymbol{\beta}_{MM} \\ \left\| {}^c\mathbf{B}_i \right\| = 1 \\ {}^c\mathbf{B}_i \cdot {}^c\mathbf{g}_i = K \end{cases}, \quad i = 1 \cdots N$$

$$(604) \begin{cases} \mathbf{AM}_i = \mathbf{SF}_{AM} \cdot {}^c\mathbf{g}_i + \boldsymbol{\beta}_{AM} \\ \left\| {}^c\mathbf{g}_i \right\| = 1 \\ \mathbf{MM}_i = \mathbf{SF}_{MM} \cdot {}^c\mathbf{B}_i + \boldsymbol{\beta}_{MM} \\ \left\| {}^c\mathbf{B}_i \right\| = 1 \\ {}^c\mathbf{B}_i \cdot {}^c\mathbf{g}_i = K \end{cases}, \quad i = 1 \cdots N$$

AUTO-CALIBRATION OF ORIENTATION SENSING SYSTEMS

FIELD OF THE INVENTION

The invention relates to an electronic device that has an orientation sensing system that comprises a first sensor for sensing acceleration and a second sensor for sensing a magnetic field. The orientation sensing system comprises a calibration system. The device is, for example, an electronic mobile device such as a mobile telephone, a palmtop PC or personal digital assistant, or a stand-alone electronic navigation device for a land vehicle, a boat or an airplane, etc. The invention also relates to a method of calibrating such a system and to software for carrying out this method on a microprocessor.

BACKGROUND ART

Compass magnetometers are calibrated in order to compensate for offsets, scale factor deviations, alignment tolerances and the influence of magnetic materials. The compensation reduces errors in the calculated orientation of the device. The aforementioned effects, and in particular the influence of magnetic materials, may change over time. Typically recalibration is needed after battery replacement, usage in a vehicle, or after exposure to a strong magnetic field. Automatic calibration may also be used to replace the one-time factory calibration, thus saving manufacturing costs.

WO 02/46693 discloses a three-axis algebraic model to numerically compensate for magnetic errors in measured magnetic field values in an electronic compass for any orientation of the compass. This model is based on physical principles and uses a linear algebra approach that facilitates computation of the parameters needed for compensation. During a calibration procedure of the electronic compass, magnetic and gravity fields are measured in three axes at each of a variety of combinations of orientations and azimuths. This set of measured magnetic and gravity fields is used to calculate a matrix compensation coefficient and a vector compensation coefficient using a system of equations. These compensation coefficients are stored and then used during normal operations of the electronic compass to correct all subsequently measured magnetometer data to obtain corrected values for the Earth's magnetic field, from which the correct azimuth can be calculated.

SUMMARY OF THE INVENTION

WO 02/46693 discloses an auto-calibration technique for a 3D magnetometer that avoids the need for a separate heading calibration. The compass has a 3D accelerometer and must be held in at least twelve different orientations, more or less equally distributed in space, during calibration. The known technique is limited to the combination of a 3D magnetometer and a 3D accelerometer. It cannot be used in the case where one or both sensors are only 2D.

It is an object of the invention to provide an auto-calibration technique that can be used with any combination of a 2D or 3D magnetometer and a 2D or 3D accelerometer.

Figure 1:
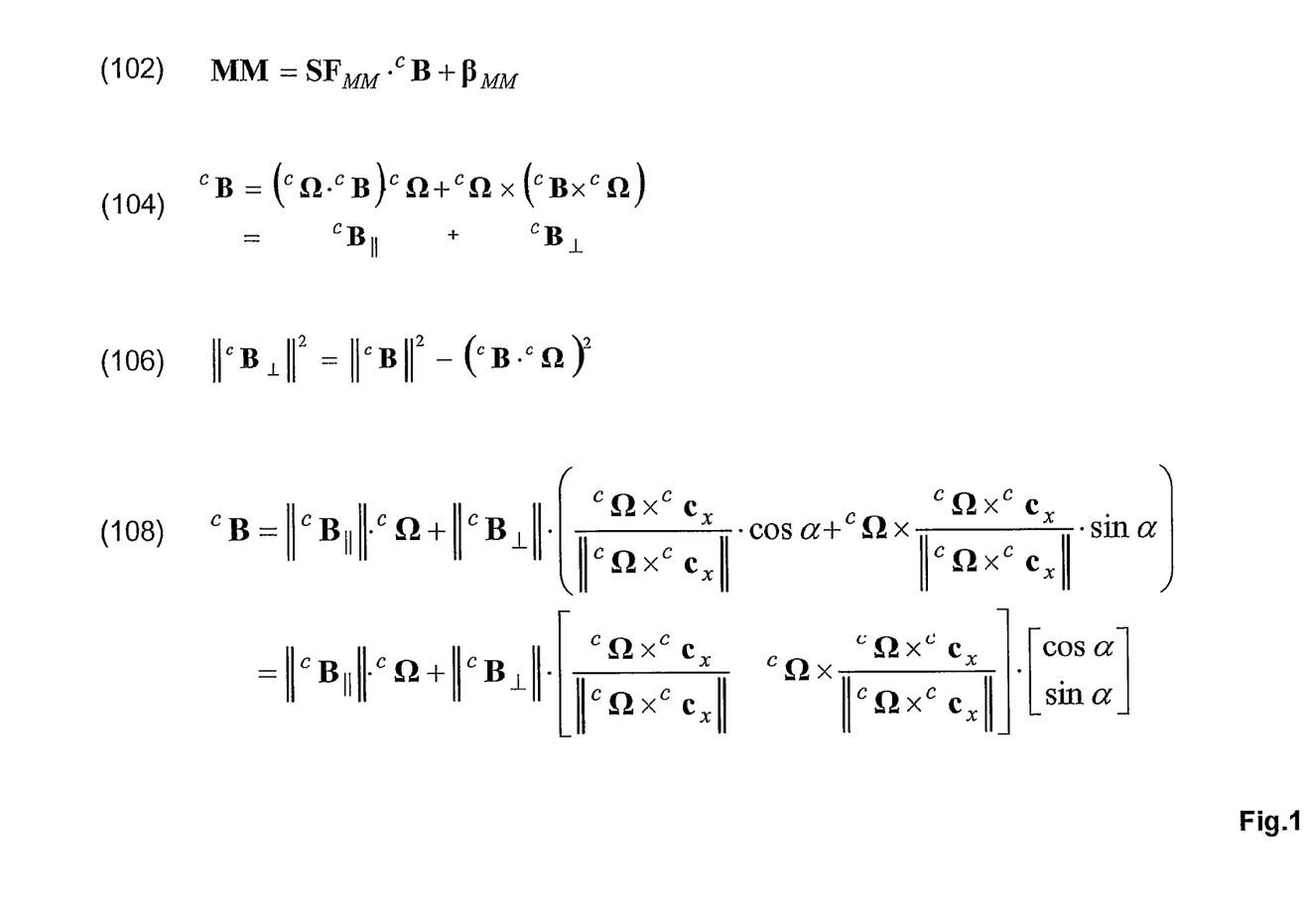
FIGS. 1, 3, 5 and 6 give mathematical equations clarifying a calibration process in the invention.

To this end, the inventors propose an electronic device with an orientation sensing system for determining an orientation of the device in operational use of the device. The orientation sensing system comprises a first sensor for supplying first vectors representative of sensed magnetic field vectors that include earth-magnetic field vectors; and a second sensor for supplying second vectors representative of sensed acceleration vectors that include the gravity field vectors. The orientation sensing system also comprises calibration means coupled to the first and second sensors and operative to calibrate the sensing system for operational use. The calibration means uses the second vectors to constrain a range of possible directions of corresponding ones of the earth-magnetic field vectors to be determined per corresponding ones of multiple orientations of the device. The calibration means is operative to numerically solve a set of equations involving first quantities representative of the first vectors and second quantities representative of the second vectors. The set includes, for each of the first quantities, a corresponding equation (102), see FIG. 1, that comprises a term that is equivalent to a matrix multiplication of a parameter matrix with the corresponding earth-magnetic field vector.

The output signal of the magnetometer is a vector that depends on the earth-magnetic field vector. The dependence on the earth-magnetic field vector is expressed by the term that is the product of a matrix with the earth-magnetic field vector. The earth-magnetic field vector is a 3D vector. The technique in WO 02/46693 relies on using the inverse of this matrix that therefore in general needs to be a square 3×3 matrix. Accordingly, the technique in WO 02/46693 is restricted to using 3D magnetometers. Furthermore, WO 02/46693 uses a 3D accelerometer. The known approach therefore cannot be applied to configurations using a 2D magnetometer and/or a 2D accelerometer. In the invention, using the equation that expresses the output vectors of the magnetometer in terms of a matrix-transformed 3D earth-magnetic field vector is not confined to a 3D magnetometer and 3D accelerometer configuration. The invention enables to use different combinations of a 2D or 3D magnetometer with a 2D or 3D accelerometer.

If a 3D magnetometer and a 3D accelerometer are being used, a set of equations is numerically solved that includes for each of the orientations a vector equation with a term that is equivalent to a matrix multiplication of a parameter matrix with the earth-magnetic field vector. The set further comprises a scalar equation for each of the orientations expressing the fact that the magnitude of the earth-magnetic field vector is constant in the sense of being independent of the orientation of the orientation sensing system at the location where the measurements are being carried out. The set also comprises a scalar equation for each of the orientations expressing the fact that the dot product of the earth-magnetic field vector and the gravity vector is independent of the orientation at the measurement location. In order to solve the set of equations, at least 7 different orientations are required to find the calibration parameter values necessary for the compensation.

For a combination of a 2D magnetometer and a 3D accelerometer, a similar set of equations is used as in the 3D/3D configuration discussed in the previous paragraph. Now, at least 9 different orientations are needed.

For a combination involving a 2D or 3D magnetometer and a 2D accelerometer the set is extended with vector equations that involve a matrix transformation to map the 3D gravity vectors on a 2D representation thereof, and with scalar equations specifying that the magnitude of the gravity vector is independent of the orientation at the measurement location. In the configuration of the 3D magnetometer and 2D accelerometer, at least 7 different orientations are needed for obtaining the calibration parameters. In the 2D/2D configuration at least 9 different orientations are needed.

In an embodiment of the invention, each of the first quantities is an average of multiple first vectors supplied by the first sensor. This averaging cancels out the effects of vibrations, thus improving accuracy.

In a further embodiment, each of the second quantities is an average of multiple second vectors supplied by the second sensor. This averaging similarly cancels out effects of vibrations and thus improves accuracy.

In yet a further embodiment, the calibration means is operative to exclude a specific one of the first vectors and an in time corresponding specific one of the second vectors from being taken into account for creating a particular one of the first quantities as a first average of particular ones of the first vectors, and for creating a corresponding particular one of the second quantities as a second average of particular ones of the second vectors, and to discontinue the creating of the particular first quantity and the creating of the corresponding particular second quantity if: the specific first vector deviates from a running version of the first average of the particular first vectors by a vector distance that exceeds a first threshold; or if the specific second vector deviates from a running version of the second average of the particular second vectors by a vector distance that exceeds a second threshold.

Accordingly, the creation of averages of the first and/or second vectors is discontinued as soon as the first sensor or the second sensor supplies a sample that deviates from the running average, built up so far, by more than a certain distance. If the average has been created from less than a certain minimum number of samples, the average will be discarded. This approach reduces the influence, on the integrity of the collected data, of dynamic orientation changes and mechanical vibrations.

In still another embodiment, a special one of the first quantities and an, in time corresponding, special one of the second quantities are excluded from the set of equations to be solved if the special second quantity has a magnitude that deviates from a further pre-determined value by more than a further threshold.

The magnitude of a second quantity is supposed to be representative of the nominal magnitude of gravity. If the second quantity's magnitude deviates from the nominal magnitude, the device is being subjected to acceleration in addition to gravity. The second quantities represent measurements of the average acceleration experienced by the device in a certain time interval. If the device is being held stationary with respect to the earth, or is moved with a uniform speed in a constant direction, the acceleration sensed is a good representative of gravity only. If the device is being accelerated, the compound acceleration as sensed is not representative of gravity. As a result the calculations to solve the set of equations and to thus obtain the calibration parameters would not be valid anymore. The conditional exclusion of the measurements then preserves integrity of the data collected.

In yet another embodiment, an individual one of the first quantities and an, in time corresponding, individual one of the second quantities are excluded from the set of equations to be solved, if a measure of dissimilarity between the individual first quantity or the individual second quantity, on the one hand, and other ones of the first or second quantities included in the set of equations to be solved, on the other hand, is smaller than still a further threshold.

Accuracy of the calibration parameters is improved if the first (or second) quantities that are included in the collection of equations, lie apart from each other more than a certain distance. That is, there is no clustering of the respective quantities within a same small region in their respective vector spaces. Clustering would lead to a near-singular set of equations.

The calibration means can be operative occasionally, e.g., upon battery replacement if the device is of a hand-held or mobile type. Alternatively, the calibration means can be operative in operational use as background process.

In still another embodiment, the first sensor comprises a 2D magnetometer; and the second sensor comprises a 3D accelerometer. This configuration has been discussed briefly above. Its attractiveness lies in the low cost-implementation.

Above embodiments of the invention relate to a physical device. The invention is also commercially interesting in the form of a method for calibrating an orientation sensing system, and to software for carrying out such method using a microprocessor.

BRIEF DESCRIPTION OF THE DRAWING

The invention is explained in further detail, by way of example and with reference to the accompanying drawing, wherein.

Throughout the Figures, similar or corresponding features are indicated by same reference numerals or labels. In the description, vector and matrix quantities are represented by bold face characters.

DETAILED EMBODIMENTS

The magnetometer in an electronic compass serves to measure the components of the earth-magnetic field vector. However, ferrous materials in the neighborhood of the magnetometer affect the magnetic field as measured by the magnetometer. If it is not known how these materials affect the measurement from the magnetometer, the orientation or heading angle output of the compass will be inaccurate. Calibration is needed to compensate for the effects of ferrous materials on the measured field, so as to maintain accuracy.

The magnetometer supplies an output signal vector MM, which is a three-dimensional (3D) vector for a 3D magnetometer, or a 2D (two-dimensional) vector for a 2D magnetometer. Vector MM is related to the 3D earth-magnetic field vector $^c$B referenced with respect to a coordinate system fixed to the compass. The superscript "c" stands for "corpus" (Latin for "body"). An expression for vector MM is given by linear matrix equation (102) in FIG. 1. The quantity $SF_{MM}$ is a 3×3 scale-factor matrix for a 3D magnetometer, or 2×3 scale-factor matrix for a 2D magnetometer. The quantity $\beta_{MM}$, is a 3D offset vector for a 3D magnetometer, or a 2D offset vector for a 2D magnetometer. Offset vector $\beta_{MM}$, is a result of magnetometer's offset and of hard-magnetic materials fixed in the vicinity of the magnetometer. Hard-magnetic materials are materials that have a permanent magnetic field of their own such as a permanent magnet. Scale-factor matrix $SF_{MM}$ accounts for the sensitivity and (mis-) orientation of the magnetometer's sensor axes with respect to the fixed coordinate system referred to above, and also for the influence of soft-magnetic materials in the vicinity of the magnetometer on local strength and direction of the earth-magnetic field.

Earth-magnetic field vector $^c$B has a constant magnitude at a given location. The direction of vector $^c$B as measured is representative of the orientation of the compass relative to the earth-magnetic field. Vector $^c$B can assume all possible directions in the body-coordinate frame. Ideally, the coordinates of the corresponding 3D MM vectors in a 3D space lie on the surface of an ellipsoid. Similarly, the coordinates of the corresponding 2D MM vectors in a 2D space lie in a closed region bounded by an ellipse.

Figure 2:
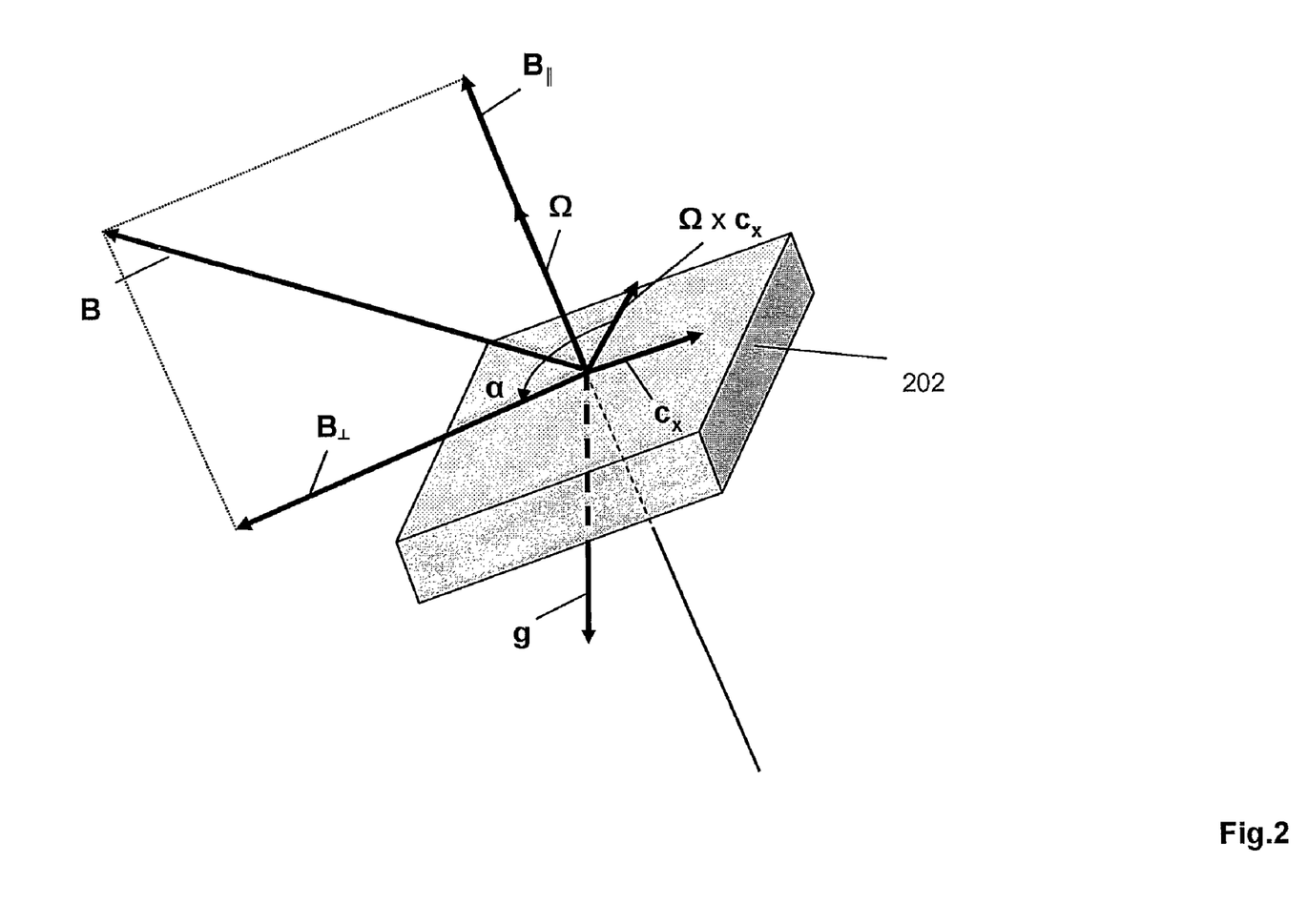
FIG. 2 is a diagram illustrating magnetic and gravity vectors relative to a device in the invention.

In typical prior art approaches, it is assumed that in operational use the compass only rotates about the same single axis (usually the vertical axis, which corresponds to an azimuth rotation). The direction of this rotation axis is indicated by a vector $^c\Omega$ of unit length. Vector $^cB$ is restricted to rotations about axis $^c\Omega$ as well. In other words there is only one degree of freedom for the direction of vector $^cB$. As a result, the corresponding 2D MM vectors terminate on an ellipse in a 2D space. Equation 104 in FIG. 1 says that vector $^cB$ can be expressed as the sum of a first, constant component $^cB_\parallel$, which is parallel to rotation axis $^c\Omega$, and a second constant-length component $^cB_\perp$ that is perpendicular to $^c\Omega$. The squared length of the second component is given by expression 106 in FIG. 1. The constraint that vector $^cB$ is assumed to rotate only about the axis with unit vector $^c\Omega$, is used to express vector $^cB$ as in equation (108). In expression (108), the vector $^cc_x$ indicates the x-axis of the coordinate system fixed to the compass body. It is assumed that vector $^c\Omega$, is not parallel to vector $^cc_x$, and the angle $\alpha$ indicates the angle over which vector $^cB_\perp$ is rotated away from vector $^c\Omega \times {}^cc_x$ about the rotation axis $^c\Omega$. This angle $\alpha$ represents the single degree of freedom of vector $^cB$ as measured. For a graphical representation of these vectors, see FIG. 2, wherein feature 202 refers to the body of the solid state compass Substituting equation 108 into equation 102 gives expression 302. Expression 302 shows that parallel component $^cB_\parallel$ gives rise to an additional offset in magnetometer's output signal vector MM, and that perpendicular component $^cB_\perp$ results in a variable contribution, dependent on angle $\alpha$.

Automatic calibration of a 2D magnetometer aims at determining the four coefficients of the compound 2×2 matrix given by expression 304, and of the two components of the compound offset vector of expression 306. If angle $\alpha$ runs from 0 to $2\pi$, vector MM of equation 302 describes an ellipse in the 2D plane. In general, an ellipse in the 2D plane is described by five independent parameters: the lengths of its two axes, an angle representative of its orientation relative to a reference coordinate system, and its 2D offset from the origin of the reference coordinate system. Therefore, if at least five measurements are obtained for vector MM at different (unknown) values of the angle $\alpha$, the five parameters of the ellipse can be fitted to the measurements. However, the five parameters that uniquely describe the fitted ellipse are not sufficient to determine the six independent parameters of the calibration model (the four parameters of the 2×2 matrix plus the two parameters of the offset vector). The offset vector itself can be uniquely determined as the center of the fitted ellipse. The four coefficients of the 2×2 matrix cannot be uniquely determined. In order to determine the four coefficients of the 2×2 matrix, the value of the angle $\alpha$ must be known as well for at least one of the five measurements. This last step is called the "heading calibration" and must be performed (manually) by the user, e.g., by means of putting the compass in a known reference orientation. This heading calibration step is highly impractical for the user: the user cannot be expected to know the correct reference orientation (that is what he/she needs the compass for!). Also the fact that the compass orientation needs to be rotated in a single plane during the calibration (and normal usage) is highly inconvenient, especially for a handheld mobile device. Examples of this type of calibration are given in the following patent documents, all incorporated herein by reference: US patent application publication 2004/0267505; U.S. Pat. Nos. 4,953,305; 5,644,851; 6,047,237; 6,173,501; 6,192,315; 6,301,794.

If the magnetometer has a 3D functionality, the useable compass orientations are not restricted to rotations about a single axis. Auto-calibration of a 3D magnetometer is then not restricted to a single rotation axis either. If the direction of earth-magnetic field vector $^cB$ varies, vector MM describes a path that lies on an ellipsoidal surface in a 3D space. The main axes of the ellipsoid are determined by the 3×3 matrix $SF_{MM}$, whereas its center is offset by 3D vector $\beta_{MM}$ with respect to the reference coordinate system. Auto-calibration of the 3D magnetometer now aims at determining the nine coefficients of 3×3 matrix $SF_{MM}$ and the three components of vector $\beta_{MM}$. In general, an ellipsoid is uniquely described by nine parameters: the lengths of its three axes, three angles representative of its orientation relative to a reference coordinate system, and the three components of the 3D offset vector identifying the ellipsoid's center relative to the reference coordinate system. As a result, at least nine different measurements of vector MM are needed in order to be able to uniquely fit the parameters of the ellipsoid to the measurements. However, the nine parameters of the fitted ellipsoid are insufficient for uniquely determining the twelve parameters of the calibration model: the nine coefficients of 3×3 matrix $SF_{MM}$ and the three components of offset vector $\beta_{MM}$. The coordinates of the center of the ellipsoid, i.e., offset vector $\beta_{MM}$, can be determined uniquely. However, the nine coefficients of matrix $SF_{MM}$ cannot be uniquely determined using the remaining six parameters describing the ellipsoid. Now, for at least two of the at least nine MM measurements the corresponding direction of vector $^cB$ must be known in order to identify the coefficients of matrix $SF_{MM}$. Accordingly, as in the 2D case, the user is to perform the cumbersome step of a heading calibration by putting the compass in two known reference orientations.

WO 02/46693, referred to in the background art section above, discloses an auto-calibration technique for a 3D magnetometer that avoids the need for a separate heading calibration. The technique is based on the use of a 3D gravity sensor (or: 3D accelerometer) that provides a reference direction for calibrating the magnetometer. The compass must be held in at least twelve different orientations, more or less equally distributed in space. The known technique is limited to the combination of a 3D magnetometer and a 3D accelerometer. It cannot be used in the case where one or both sensors are only 2D.

Figure 3:
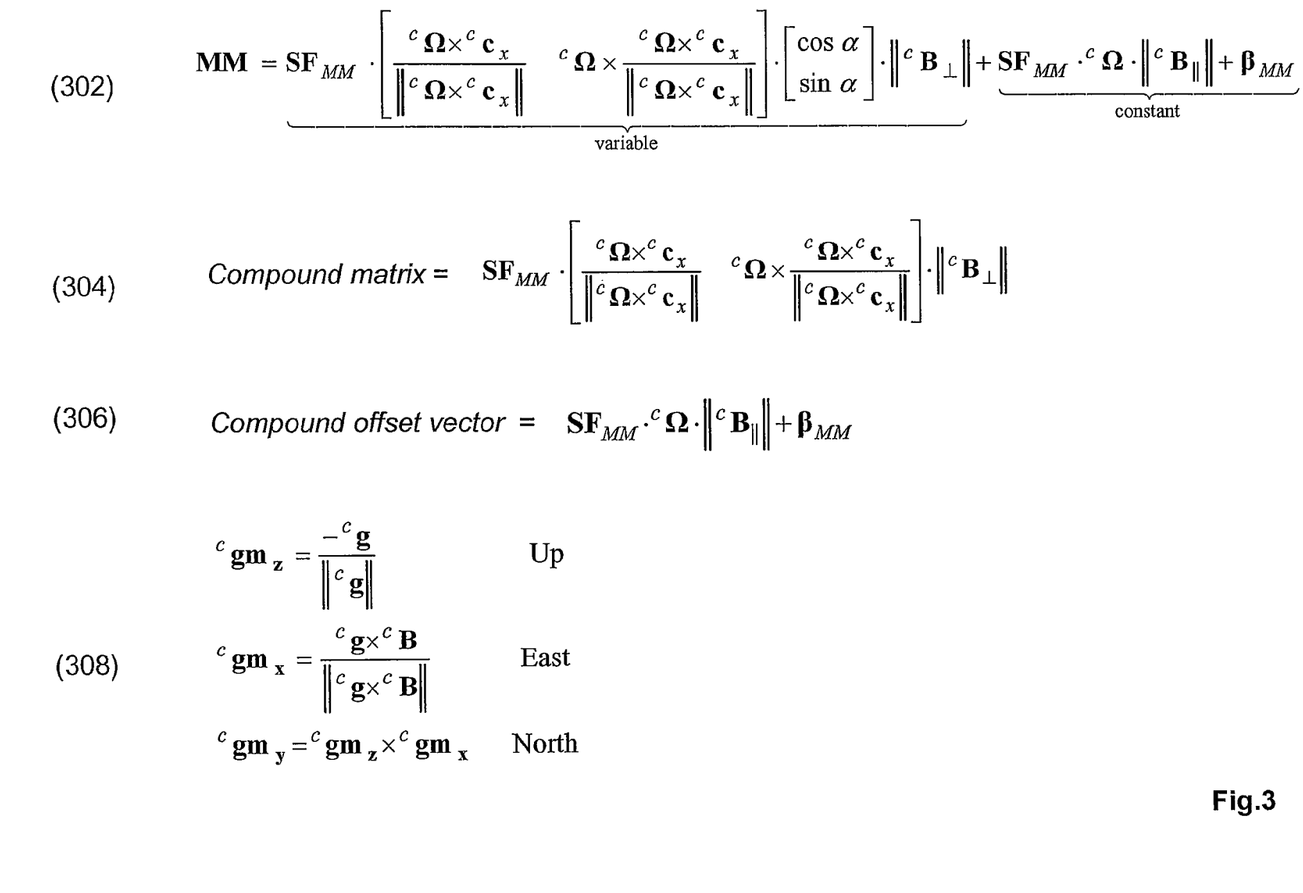

In orientation sensing systems and tilt-compensated compasses, an accelerometer is added to measure the direction of the earth's gravitational acceleration, $^cg$. With both $^cB$ and $^cg$ obtained from measurements, one can determine the orientation of the compass by calculating the reference axes of the geomagnetic reference coordinate system (east, north, up) as given in equations (308) of FIG. 3. From these one can calculate other quantities, such as the tilt-compensated heading angle for a compass.

As is disclosed in WO 02/46693, the measurement of the direction of $^cg$ by means of an accelerometer can also be used as a reference direction for auto-calibration of all parameters of the magnetometer model. This is because the angle between vectors $^cB$ and $^cg$ is constant for a given location on earth. Thus, knowledge of the direction of $^cg$ for each particular measurement of vector MM constrains the possible directions of the corresponding unknown vector $^cB$ to those lying on a conical surface with an axis parallel to $^cg$ and intersecting the top of the cone. This approach to auto-calibration eliminates the need for the user to execute a heading calibration step. The compass becomes fully self-calibrating.

The technique disclosed in WO 02/46693 focuses exclusively on the combination of a 3D magnetometer and a 3D accelerometer. A 2D magnetometer has advantages related to, e.g., cost with respect to a 3D magnetometer. The known technique, however, is not applicable to a 2D magnetometer The inventors now propose an alternative method that is suitable for automatic calibration of the magnetometer model parameters for both a 2D magnetometer and a 3D magnetometer. Moreover, again unlike the known technique, the methods in the invention can work also with a 2D accelerometer, as well as with a 3D accelerometer. In addition, the alternative according to the invention is more relaxing regarding the requirements imposed on the number and spatial distribution of the orientations for which samples must be taken to calibrate the system.

The known method of WO 02/46693 requires a minimum of twelve, or preferably sixteen, different orientations which must be spaced more or less evenly in order to achieve good convergence of the initial linear fitting procedure. Applying the method of the invention to a compass with a 3D magnetometer and a 3D accelerometer, the minimum number of orientations required for calibration is reduced to seven, or preferably 10, and their distribution is of less importance, so long as there is no clustering of orientations. This allows the method of the invention to be used without the user being actively involved. This greatly benefits user-friendliness, as the algorithm is able to collect the relevant sensor data in a background process in operational use of the compass.

Figure 4:
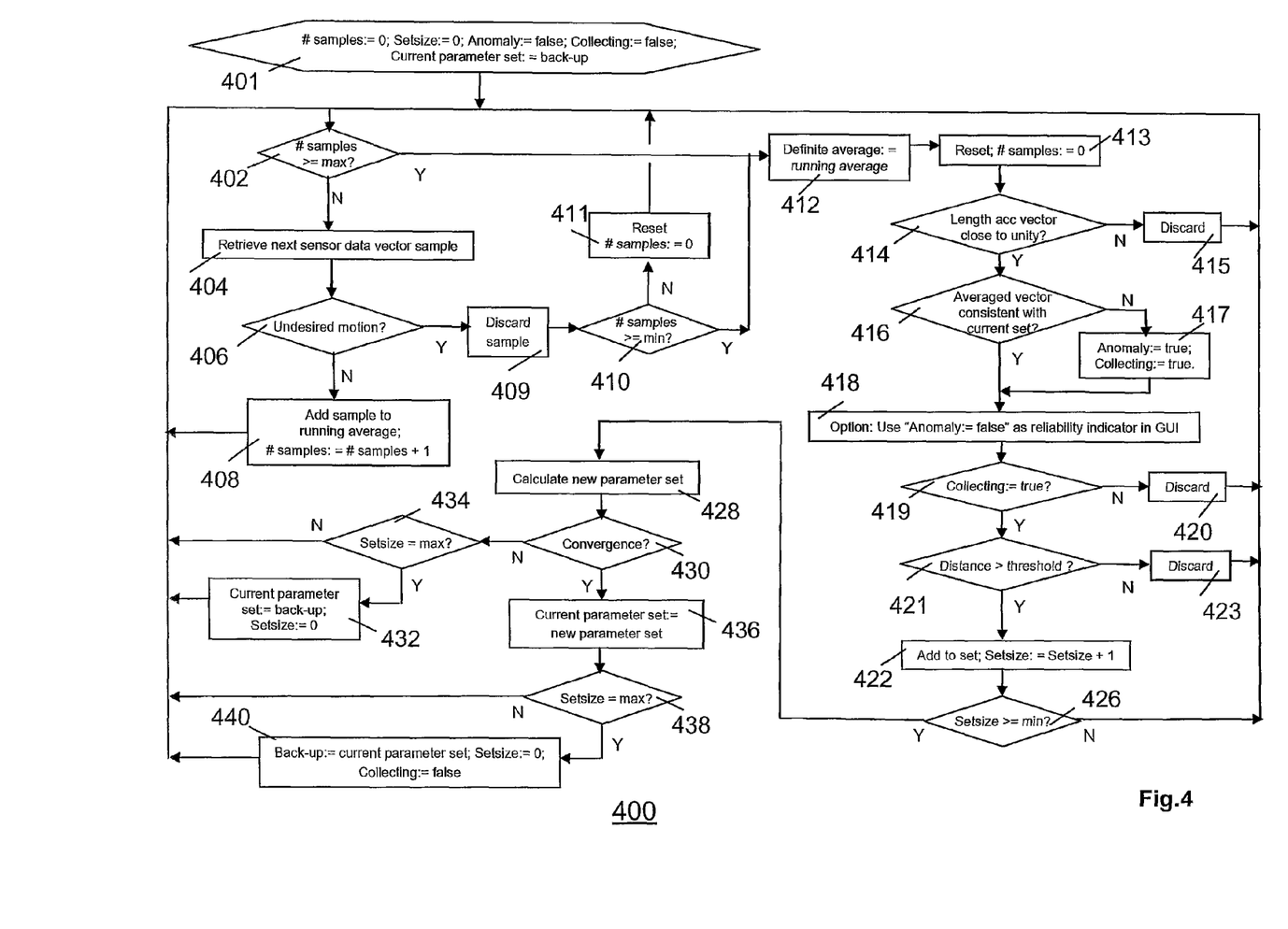
FIG. 4 is a diagram of relevant steps in a calibration process of the invention.

FIG. 4 is a diagram of a process 400 listing the major steps of an auto-calibration method according to the invention. Process 400 is based on collecting samples of sensor data vectors, each vector comprising all sensor channels. The respective components of each sampled sensor data vector represent the sensor's output signals representative of a component of $^cB$ or $^cg$ by the respective sensor channels at a particular instant. The average is calculated for the samples collected at different successive instants. An adequate number of averaged samples are generated so as to be able to carry out a fitting algorithm in order to determine the parameters of the scale factor matrix $SF_{MM}$ and the offset vector $\beta_{MM}$.

The process is initialized in a step 401. The number of samples collected is set to zero. The size of the set of averaged vectors is set to zero. An Anomaly flag is set to "false". A Collecting flag is set to "false". A current parameter set is restored from a back-up. While collecting the samples it is determined in a step 402 whether or not enough samples have been collected to determine a meaningful average. If there have not been enough samples taken yet, a next sample is retrieved in a step 404. In a step 406 it is determined whether or not the most recent sample was taken during a time period wherein the compass was subjected to substantial changes in orientation or acceleration. A way of determining whether the compass was subjected to undesired motion is for example the following. The data from each sensor channel is compared to the running average for that channel at each new sampling instant. If the current sample obtained for any of the sensor channels deviates by more than a predefined threshold from the running average for that channel, the conclusion can be drawn that the compass has been subjected to a significant motion. If the deviation is below the threshold, the running average sensor data vector is updated in a step 408 so as to include the new sample and process 400 returns to step 402 for determining whether a next sample is necessary.

If it was determined in step 406 that there had been undesired motion while taking the sample, process 400 proceeds to a step 409 wherein the current sample is discarded. In a step 410 it is determined whether the number of samples gathered so far is higher than a predetermined minimum. If the number is lower than the minimum, process 400 proceeds to a step 411 wherein the register for storing the running average is reset and the variable representative of the number of samples is reset to zero, whereupon process 400 returns to step 402. If the number of samples gathered is higher than the minimum, process 400 proceeds to a step 412, wherein the running average then becomes the definite average. Similarly, if in step 402 it was decided that an adequate number of samples has been collected for a meaningful average, process 400 proceeds to step 412.

In a step 413, the register for storing the running average is reset in order to be able to start calculating the next average. In a step 414 it is determined whether the magnitude of the definite averaged acceleration vector was sufficiently close to the (normalized) magnitude of the gravity vector. If there was a large enough discrepancy, the average is discarded in a step 415 and process 400 returns to step 402. If the measured acceleration was acceptable, process 400 proceeds to a step 416, wherein it is determined whether or not the averaged vector is consistent with the current set of parameters of the magnetometer calibration model. If there is insufficient consistence, the Anomaly flag is set to "true" and the Collecting" flag is set to "true" in a step 417. The Anomaly flag indicates whether or not the most recent averaged vector is consistent with the parameter set that is currently in use to compensate the magnetometer readings. The value "false" of the Anomaly flag can be used, optionally, to affirm in a step 418 the reliability of the results rendered in a user interface (not shown) of an electronic compass of the invention. The setting of the Collecting flag to "true" is a trigger to start collecting averaged vectors. That is, the creation of a set of averaged vectors is started after the first anomaly has been detected. Once the creation has started, vectors can be added that just happen to be consistent with the current set. It is determined in a step 419 whether the Collecting flag is true. If it is not, the definite averaged sensor data vector is discarded in a step 420 and the process returns to step 402.

If the Collecting flag is true, it is determined in a step 421 whether the averaged sensor data vector is sufficiently different from all other averaged sensor data vectors collected previously. This can be done, e.g., by determining whether its distance to each of the previously collected averaged vectors is sufficiently large. If the distance is sufficiently large, the current averaged sensor data vector is added to the set of previously collected averaged sensor data vectors and the variable "Setsize" is incremented in a step 422. Otherwise the averaged sensor data is discarded in a step 423, whereupon process 400 returns to step 402. The distance can be represented in many different ways, e.g., the Euclidean distance measured in a space of a dimension equal to the number of sensor channels. Weighting factors may be applied to the individual components of the vectors compared, e.g., in case some sensor axis is less reliable (more noisy) than others. Distances may also be determined separately for the magnetometer signal vectors and the accelerometer signal vectors. The relevant criterion for acceptance is that each respective one of the distances be larger than a certain respective threshold.

In a step 426 it is determined whether the set of averaged vectors thus collected contains a sufficient number of vectors. If the number is sufficient, a fitting routine is then executed in a step 428 to determine a new set of the magnetometer model parameters, given the set of averaged sensor data vectors. In a step 430 it is determined whether the fitting routine converges in that the residue has become sufficiently small so that the set of averaged vectors, subjected to the routine, is self-consistent. If the routine does not converge, it could be that the magnetic anomaly has changed during the process of collecting averaged vectors. For example, the electronic compass carrying out the automatic calibration was residing in the vicinity of an iron object for a moment. This could imply that the routine would never converge to a set of calibration parameters that is consistent with each member of the set of averaged vectors. In that case, the set of averaged vectors is to be flushed, the variable "Setsize" is reset to zero, and a backup of the parameter set is restored in a step 432 whereupon process 400 returns to step 402. However, another reason for convergence not to occur (yet) could be that the set of averaged vectors collected so far does not carry enough information in order to let the routine indeed converge to a set of calibration parameters. In the latter case, convergence can be achieved after collecting additional averaged vectors. Accordingly, it is first determined in a step 434 whether the variable "Setsize" has reached a predetermined maximum. If so, process 400 proceeds to step 432. If not, process 400 proceeds to step 402 for collecting additional averaged vectors.

If it is determined in step 430 that convergence has occurred, i.e., the residue is acceptably small, process 400 proceeds to a step 436, wherein the new set of calibration parameters is released for operational use. In a step 440, the current parameter set is backed-up, the variable "Setsize" is reset to zero and the Collecting flag is reset to "false". But this is only done after it has been determined in a step 438 whether convergence has occurred with the maximum number of averaged vectors. This guarantees the reliability of the backed-up parameter set. If the maximum number of averaged vectors has not been reached yet, the collecting of averaged vectors continues when process 400 returns to step 402.

The convergence test involves for example, calculation of, e.g., a root mean square fitting residue, and testing it for being lower than a predefined threshold level.

Figure 5:
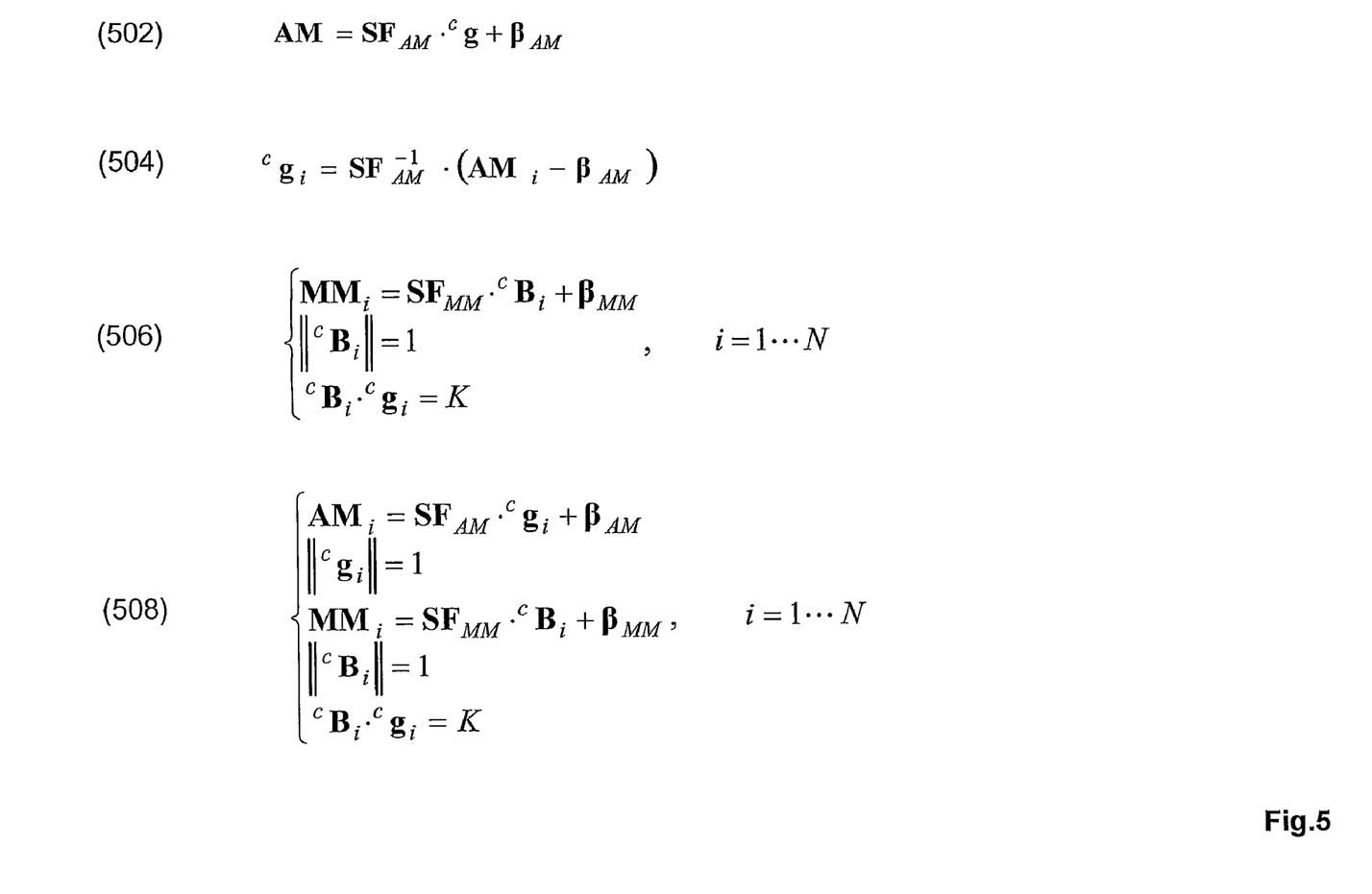

The iterative fitting routines of process 400 will not only involve the magnetometer data vectors $MM_i$ but also the accelerometer data vectors $AM_i$ rather than the directly calculated gravity vectors $^cg_i$ for the various sensors configurations wherein a 2D accelerometer is being used in combination with a 2D or 3D magnetometer. In order to do so, an expression involving vector $^cg$ being measured by an accelerometer (2D or 3D) is given by formula 502, which has a structure equivalent to expression 102. Herein, the quantity $SF_{AM}$ is the scale factor matrix (accounting for sensitivity and accuracy in orientation with respect to the body coordinate axes) and $\beta_{AM}$ is the offset vector. It is assumed that both $SF_{AM}$ and $\beta_{AM}$ have been determined by a factory calibration procedure. As part of this procedure, the scaling of $SF_{AM}$ is chosen such that the length of vector $^cg$ is set to unity.

Now, consider the information obtained from the measurements $MM_i$ and $AM_i$ for the $i^{th}$ orientation of the compass. Depending on the sensor configuration (2D or 3D magnetometer, accelerometer), samples are obtained of between four and six different scalar signals for each orientation i (i.e., a four to six dimensional sensor data vector). Since each orientation i has three degrees of freedom, which are not known in advance, three unknown parameters are also introduced. This suggests that the four- to six dimensional sensor data vector of each additional orientation allows determining of the values of one, two or three of the original unknown parameters. However, in case of a 3D accelerometer, the data vector supplied by the accelerometer allows determining of only two directional degrees of freedom (being the direction of the vector $^cg$). Thus, the four- to six dimensional sensor data vector of each additional orientation allows determining of the values of one or two of the original unknown parameters.

Below, various compass configurations using different combinations of 2D or 3D magnetometers and 2D or 3D accelerometers will be discussed in some more detail.

A first configuration uses a 3D magnetometer and a 3D accelerometer. In this case there are 9 unknown coefficients in matrix $SF_{MM}$ and 3 unknown components in vector $\beta_{MM}$, amounting to twelve unknown parameters of the magnetometer calibration model. For each orientation i, vector $^cg_i$ is obtained directly from equation (504) being the inverse of equation (502). The magnetometer samples $MM_i$ each relate to a corresponding earth-magnetic vector $^cB_i$, which has three unknown components. What is known of $^cB_i$ is that its magnitude must be the same for all orientations i (without compromising generality, the length of vector $^cB_i$ is set to unity), and its dot-product with vector $^cg_i$ must be the same for all orientations i. Thus, for N orientations (or N sensor data vectors) a set of 5N non-linear equations is obtained as represented in FIG. 5 by reference numeral (506). The dot-product K is considered an additional unknown (scalar) constant. Thus, the total number of unknowns in this set of 5N equations amounts to 13+3N: 9 unknowns in matrix $SF_{MM}$, 3 unknowns in vector $\beta_{MM}$, the unknown dot-product K and 3N unknowns for N measurements of vector $^cB_i$, in N different orientations. If 5N<13+3N, then the set of equations has a continuous solution space of dimension 13−2N. For N>7 the solution space is discrete (dimension 0). Because the equations are non-linear, the number of discrete solutions may be larger than one. In short, sensor data vectors for at least 7 different orientations are needed in order to solve the set. The requirement of N=7 implies 35 scalar equations in 34 unknowns.

A second configuration uses a 3D magnetometer and a 2D accelerometer. Unlike with the first configuration, $SF_{AM}$ is a non-square matrix and vector $^cg_i$ cannot directly be obtained by the inverse of equation 502. Hence now the measured vectors $^cg_i$ are additional unknowns and the set of equations to be solved is the one indicated by reference numeral 508 in FIG. 5. Now there are 13+6N unknowns, and the number of scalar equations equals 8N. The solution space is discrete if 8N>13+6N and, therefore, if N>7. As in the first configuration, sensor data vectors are needed from at least 7 different orientations to solve the set, which for N=7 consists of 56 equations with 55 unknowns.

Figure 6:
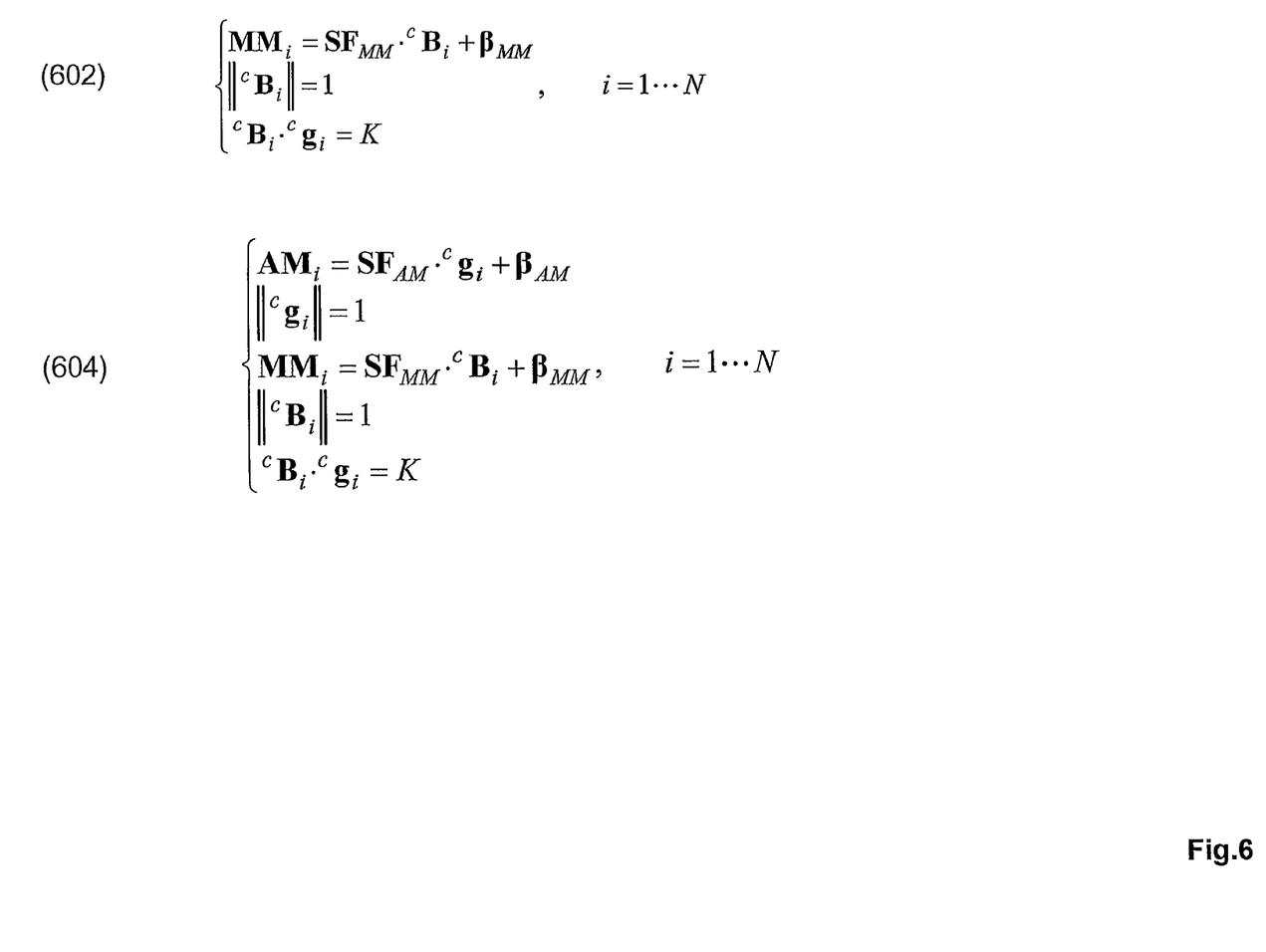

A third configuration uses a 2D magnetometer and a 3D accelerometer. Now there are 8 unknown original parameters involved in matrix $SF_{MM}$ and vector $\beta_{MM}$ combined. The dot-product K is the ninth unknown parameter. Similar to the first configuration, vector $^cg_i$ can be obtained directly from equation 504. The set of equations results as indicated by reference numeral 602 in FIG. 6. Vectors $MM_i$ are now 2D vectors. The total number of unknowns in this set of equations is 9+3N, the number of scalar equations being 4N. A discrete solution space is obtained if 4N>9+3N, which implies that N>9. Accordingly, sensor data vectors for at least 9 different orientations are needed in order to solve set 602. For N=9, set 602 consists of 36 scalar equations in 36 unknowns.

A fourth configuration uses a 2D magnetometer and a 2D accelerometer. Again, there are 8 unknown original parameters involved in matrix $SF_{MM}$ and vector $\beta_{MM}$ combined. The dot-product K is the ninth unknown parameter. The set of equations to be solved is given by reference numeral 604 in FIG. 6. Now, there is a total of 9+6N unknowns in 7N scalar equations. The solution space is discrete if N>9. For N=9, the set consists of 63 equations in 63 unknowns.

It should be mentioned that in all of the above four configurations the sets of equations are highly sparse, although the dimensionality of the set of equations is quite large. This is because each of the unknown vectors $\beta_i$ and $^c g_i$ appears in only a small number of equations. The sparseness considerably reduces the computational complexity of solving the sets of equations.

Solving a set of N non-linear equations in N unknowns is a multidimensional root-finding problem, which is known to be a difficult numerical problem. A basic algorithm for multidimensional root finding is known under the name of "Newton-Raphson", which is based on calculating a derivative matrix (Jacobian) of the non-linear functions and using an iterative process. Newton-Raphson has quick (quadratic) convergence when it is close to the root, but it can also be very unreliable when far away from the root. To fix-up global convergence properties, some modifications have to be implemented (line-search). These are standard techniques for multidimensional root finding and known in the art.

Figure 7:
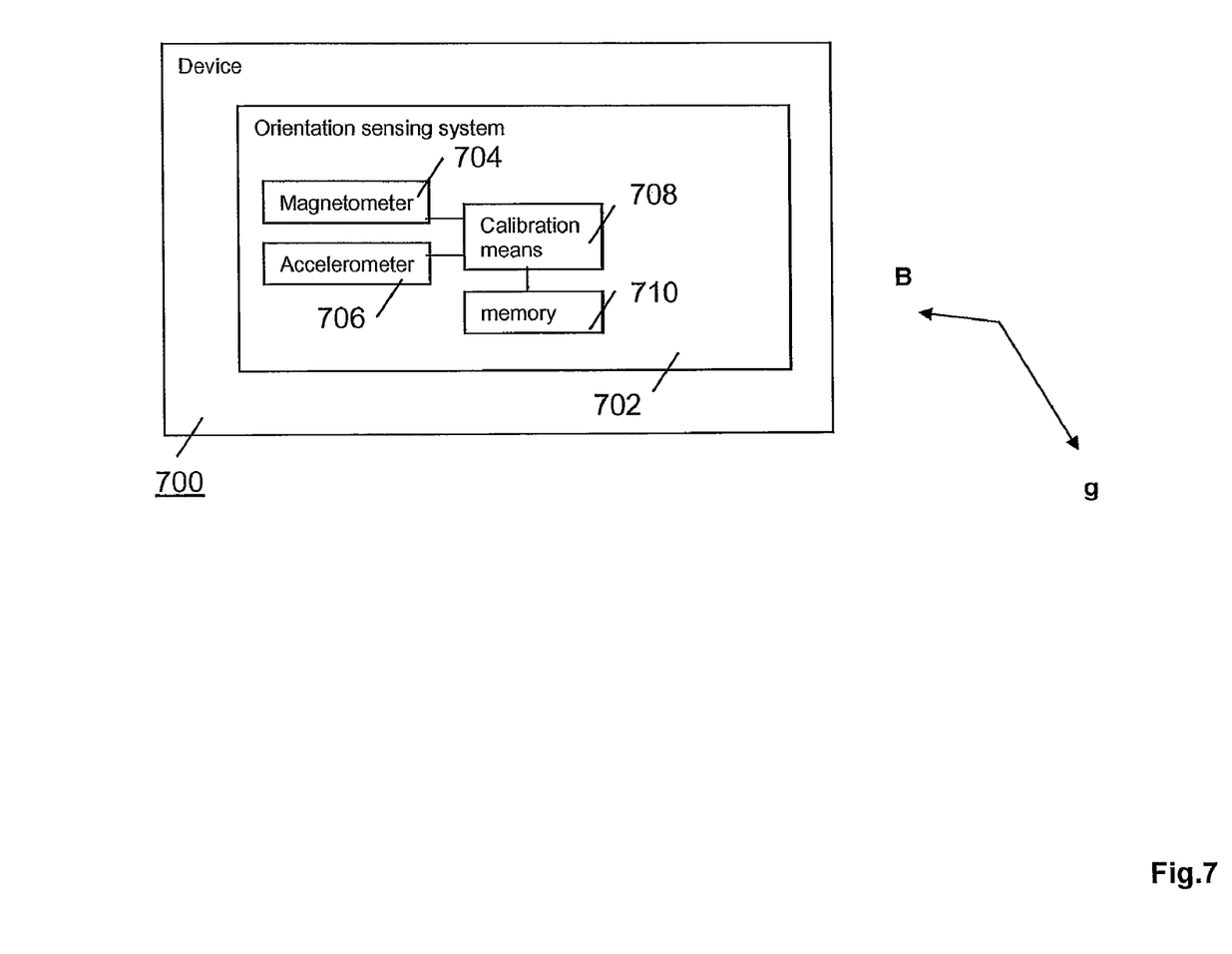
FIG. 7 is a block diagram of a device in the invention.

FIG. 7 is a block diagram of an electronic device 700 in the invention. Device 700 is, e.g., a handheld device such as a dedicated navigational aid or a mobile telephone or a personal digital assistant. Alternatively, device 700 is built-in in, e.g., a vehicle to provide navigational assistance during use of the vehicle. Device 700 comprises an orientation sensing system 702 that determines an orientation of device 700 relative to the earth-magnetic field and gravity. To this end, system 702 has a magnetometer 704 and an accelerometer 706. System 702 further has calibration means 708 that calibrates system 702 by determining the values of the parameters needed to let system 700 accurately determine its orientation. The calibration processes have been discussed above in detail. Calibration means 708 stores the relevant parameter values in a memory 710 so as to have them available for operational use of system 700. In operational use, system 700 uses the parameters that include the coefficients of scale factor matrix $SF_{MM}$ and of offset vector $\beta_{MM}$ to determine the orientation accurately.

Calibration means 708 can be implemented in hardware using electronic circuitry. Alternatively, calibration means 708 can be implemented in software, using a microprocessor to carry out the software's instructions. The software could be provided, by a supplier, on a physical carrier such as a CD, a memory card or an integrated circuit module. Alternatively, the software could be downloaded via a data network such as the Internet for being installed on an electronic device according to the invention. For example, consider a mobile telephone that the manufacturer has provided with a magnetometer and an accelerometer, but that has not been provided with the software to implement the orientation sensing system of the invention. The orientation sensing functionality could then be enabled by obtaining the software as an after-market add-on or an upgrade for an additional fee.

Accordingly, an electronic device in the invention has an orientation sensing system for determining an orientation of the device. The system comprises a magnetometer and an accelerometer. The system further has calibration means to calibrate the sensing system for operational use. The accelerometer supplies measurements used to constrain a range of possible directions of the external magnetic field to be determined. The calibration means numerically solves a set of equations and is equally well useable for a 2D or 3D magnetometer in combination with a 2D or 3D accelerometer.

The invention claimed is:

1. An electronic device with an orientation sensing system for determining an orientation of the electronic device in operational use of the electronic device, the orientation sensing system comprising:

a first sensor comprising a 2D magnetometer or a 3D magnetometer configured to supply first vectors representative of earth-magnetic field vectors;

a second sensor comprising a 2D accelerometer or a 3D accelerometer configured to supply second vectors representative of gravity field vectors; and a calibration device coupled to the first and second sensors configured to calibrate the orientation sensing system for operational use, wherein the calibration device is configured to use the second vectors to constrain a range of possible directions of corresponding earth-magnetic field vectors to be determined per corresponding orientations of the electronic device and numerically solve a set of equations involving first quantities representative of the first vectors and second quantities representative of the second vectors, wherein the set includes, for each of the first quantities, a corresponding equation that comprises a term that is equivalent to a matrix multiplication of a parameter matrix with the corresponding earth-magnetic field vector, second equations specifying a magnitude of the earth-magnetic field vector for the multiple orientations, third equations specifying a value of a dot product of the earth-magnetic field vector with the gravity field vector for the multiple orientations, and a minimum number of the multiple orientations is no more than ten.

2. The electronic device of claim 1, wherein at least each of the first quantities is an average of multiple first vectors supplied by the first sensor.

3. The electronic device of claim 1, wherein the calibration device is configured to exclude a specific one of the first vectors and a specific one of the second vectors from being taken into account for creating a particular one of the first quantities as a first average of particular ones of the first vectors, and configured to create a corresponding particular one of the second quantities as a second average of particular ones of the second vectors.

4. The electronic device of claim 3, wherein the calibration device is configured to discontinue the creating of the particular first quantity and the creating of the corresponding particular second quantity if the specific first vector deviates from a running version of the first average of the particular first vectors by a vector distance that exceeds a first threshold.

5. The electronic device of claim 3, wherein the calibration device is configured to discontinue the creating of the particular first quantity and the creating of the corresponding particular second quantity if the specific second vector deviates from a running version of the second average of the particular second vectors by a vector distance that exceeds a second threshold.

6. The electronic device of claim 1, wherein a current sample is excluded from the set of equations to be solved if a magnitude of the current sample deviates from a running average by more than a further threshold.

7. The electronic device of claim 1, wherein an averaged sensor data vector is excluded from the set of equations to be solved if a measure of dissimilarity between the averaged sensor data vector and previously collected averaged vectors is smaller than a distance threshold.

8. The electronic device of claim 1, wherein the calibration device is configured to operate in a background process during operational use of the electronic device.

9. The electronic device of claim 1, wherein at least each of the second quantities is an average of multiple second vectors supplied by the second sensor.

10. A method of calibrating an orientation sensing system configured to determine an orientation of the orientation sensing system, wherein the orientation sensing system, comprises a first sensor comprising a 2D magnetometer or a 3D magnetometer configured to supply first vectors representative of earth-magnetic field vectors; and a second sensor comprising a 2D accelerometer or a 3D accelerometer configured to supply second vectors representative of gravity field vectors, wherein the method comprises:

using the second vectors to constrain a range of possible directions of corresponding earth-magnetic field vectors to be determined per corresponding orientations of the system; and numerically solving, by a microprocessor, a set of equations involving first quantities representative of the first vectors and second quantities representative of the second vectors, wherein the set includes, for each of the first quantities, a corresponding equation that comprises a term that is equivalent to a matrix multiplication of a parameter matrix with the corresponding earth-magnetic field vector, second equations specifying a magnitude of the earth-magnetic field vector for the multiple orientations, and third equations specifying a value of the dot product of the earth-magnetic field vector with the gravity field vector for the multiple orientations, and a minimum number of the multiple orientations is no more than ten.

11. The method of claim 10, further comprising:
averaging multiple ones of the first vectors to form the first quantities.

12. The method of claim 10, further comprising:
excluding a specific one of the first vectors and a specific one of the second vectors from being taken into account for creating a particular one of the first quantities as a first average of particular ones of the first vectors; and
creating a corresponding particular one of the second quantities as a second average of particular ones of the second vectors.

13. The method of claim 12, further comprising:
discontinuing the creating of the particular first quantity and the creating of the corresponding particular second quantity if the specific first vector deviates from a running version of the first average of the particular first vectors by a vector distance that exceeds a first threshold.

14. The method of claim 12, further comprising:
discontinuing the creating of the particular first quantity and the creating of the corresponding particular second quantity if the specific second vector deviates from a running version of the second average of the particular second vectors by a vector distance that exceeds a second threshold.

15. The method of claim 10, further comprising:
excluding a current sample from the set of equations to be solved if the current sample has a magnitude that deviates from a running average by more than a further threshold.

16. The method of claim 10, further comprising:
excluding an averaged sensor data vector from the set of equations to be solve if a measure of dissimilarity between the averaged sensor data vector and previously collected averaged vectors is smaller than a distance threshold.

17. The method of claim 10, wherein the method is performed as a background process during operational use of the orientation sensing system.

18. A non-transitory medium comprising instructions for implementing the method of claim 10.

19. The method of claim 10, further comprising:
averaging multiple ones of the second vectors to form the second quantities.

* * * * *